United States Patent
Wang et al.

(10) Patent No.: US 11,539,561 B2
(45) Date of Patent: *Dec. 27, 2022

(54) DIGITAL MOBILE RADIO WITH ENHANCED TRANSCEIVER

(71) Applicant: Analog Devices International Unlimited Company, Limerick (IE)

(72) Inventors: Jian Wang, Beijing (CN); Yong Wang, Beijing (CN); Haijiao Fan, Beijing (CN); Reza Alavi, Belle Meade, NJ (US); Abdelaziz Chihoub, Lawrenceville, NJ (US); Esha John, Sunnyvale, CA (US); Saeed Aghtar, Hillsborough, NJ (US)

(73) Assignee: Analog Devices International Unlimited Company, Limerick (IE)

( * ) Notice: Subject to any disclaimer, the term of this patent is extended or adjusted under 35 U.S.C. 154(b) by 29 days.

This patent is subject to a terminal disclaimer.

(21) Appl. No.: 17/156,871

(22) Filed: Jan. 25, 2021

(65) Prior Publication Data

US 2021/0176102 A1 Jun. 10, 2021

Related U.S. Application Data

(63) Continuation of application No. 16/269,532, filed on Feb. 6, 2019, now Pat. No. 10,904,055.

(30) Foreign Application Priority Data

Jan. 18, 2019 (WO) ................ PCT/CN2019/072382

(51) Int. Cl.
*H04L 27/156* (2006.01)
*H04L 27/144* (2006.01)
(Continued)

(52) U.S. Cl.
CPC ....... *H04L 27/1566* (2013.01); *H04B 17/318* (2015.01); *H04L 27/144* (2013.01);
(Continued)

(58) Field of Classification Search
CPC .............. H04L 27/1566; H04L 27/144; H04L 27/1563; H04B 17/318; H04W 52/0229; H04W 56/001
(Continued)

(56) References Cited

U.S. PATENT DOCUMENTS 6,236,674 B1 5/2001 Morelli et al.
6,728,301 B1 * 4/2004 Chrisikos ............. H04B 1/7115
375/147
(Continued)

FOREIGN PATENT DOCUMENTS

CN 1698278 A 11/2005
CN 1841945 A 10/2006
(Continued)

OTHER PUBLICATIONS

Office Action issued in CN202010050011.6 dated May 8, 2021, 9 pages.
(Continued)

*Primary Examiner* — Obaidul Huq
(74) *Attorney, Agent, or Firm* — Akona IP PC

(57) ABSTRACT

Apparatuses and methods related to digital mobile radio (DMR) with enhanced transceiver are disclosed herein. The transceiver detects waveforms of signals received by a digital mobile station radio (MS). By detecting whether the waveforms of the signals, the transceiver allows a digital baseband processor of the MS to remain in a sleep state while the signals are being detected by the DMR, thereby reducing an amount of power used while the signals are being detected.

20 Claims, 8 Drawing Sheets

(51) Int. Cl.
*H04B 17/318* (2015.01)
*H04W 52/02* (2009.01)
*H04W 56/00* (2009.01)

(52) U.S. Cl.
CPC ..... *H04L 27/1563* (2013.01); *H04W 52/0229* (2013.01); *H04W 56/001* (2013.01)

(58) Field of Classification Search
USPC .................................... 370/310, 328, 329
See application file for complete search history.

(56) References Cited

U.S. PATENT DOCUMENTS

| | | | |
|---|---|---|---|
| 2006/0153141 A1* | 7/2006 | Hirano | H04W 56/0035 370/335 |
| 2006/0252448 A1 | 11/2006 | Ichikawa | |
| 2007/0082647 A1 | 4/2007 | Behzad et al. | |
| 2009/0168848 A1* | 7/2009 | Constantinidis | H04B 1/707 375/140 |
| 2011/0111714 A1* | 5/2011 | Balakrishnan | H04B 17/318 455/161.3 |
| 2013/0244581 A1 | 9/2013 | Fukase | |
| 2015/0249914 A1* | 9/2015 | Yu | H04W 4/021 370/328 |
| 2017/0201400 A1* | 7/2017 | Park | H04L 27/30 |

FOREIGN PATENT DOCUMENTS

| | | |
|---|---|---|
| CN | 1946199 A | 4/2007 |
| CN | 101902807 A | 12/2010 |
| CN | 102056028 A | 5/2011 |
| CN | 103326733 A | 9/2013 |
| CN | 103684496 A | 3/2014 |
| CN | 109150224 A | 1/2019 |
| EP | 1612955 A1 | 1/2006 |

OTHER PUBLICATIONS

EN Abstract, Description and Claims of CN101902807A, 16 pages.
EN Abstract, Description and Claims of CN103684496A, 8 pages.
EN Abstract, Description and Claims of CN109150224A, 8 pages.
EN Abstract of CN102056028A, 1 page.

* cited by examiner

DIGITAL MOBILE RADIO WITH ENHANCED TRANSCEIVER

PRIORITY DATA

This application is a non-provisional application and claims benefit to PCT Application Serial No. PCT/CN2019/072382 filed Jan. 18, 2019, entitled "DIGITAL MOBILE RADIO WITH ENHANCED TRANSCEIVER" and U.S. patent application Ser. No. 16/269,532 filed Feb. 6, 2019, entitled, "DIGITAL MOBILE RADIO WITH ENHANCED TRANSCEIVER, both of which are hereby incorporated by reference in their entirety.

FIELD OF THE DISCLOSURE

The present disclosure relates to radio technology. More specifically, this disclosure describes apparatuses and procedures relating to enhanced transceivers for digital mobile radio.

BACKGROUND

Digital mobile radio (DMR) has developed as a popular radio protocol for land mobile radio. Mobile station radio (MS), which may also be referred to as DMR radio or DMR walkie-talkie, often support both DMR and analog frequency modulation (FM). In order to support both DMR and FM, the MS determines whether a DMR signal or an FM signal is received by the MS.

The MS includes a radio frequency (RF) transceiver (TRx) and a baseband integrated circuit (BBIC). In legacy implementations, the TRx includes a TRx transmitter channel (RF Tx) and a TRx receiver channel (RF Rx) for transmission and reception of signals via an antenna of the MS, and the BBIC determines whether received signals is a DMR signal or an FM signal.

The legacy implementations of an MS switch among three states during operation. In a transmission (TX) state, the RF Tx and the BBIC are in an active mode to provide for transmission of signals via the antenna. In a reception (RX) state, the RF Rx and the BBIC are in an active mode to provide for reception of signals via the antenna. In an idle state, the MS is put to sleep to save power. However, the MS has wake periods during the idle state to detect incoming signals. During these wake periods, the RF Rx and the BBIC in legacy implementations are in an active mode to perform DMR signal detection. While the idle state does save some power, having to maintain the RF Rx and the BBIC in active mode during the wake periods causes power to be drawn by both the RF Rx and the BBIC during these time periods. As power is limited in an MS, power draws can affect the operation time of the MS between required charging.

SUMMARY OF THE DISCLOSURE

Apparatuses and methods related to digital mobile radio (DMR) with enhanced transceiver are disclosed herein. The transceiver detects signals received by a mobile station radio (MS). By detecting the signals, the transceiver allows a digital baseband processor of the MS to remain in a sleep state while the signals are being detected by the DMR, thereby reducing an amount of power used by the total MS while the signals are being detected.

According to one aspect, an apparatus may perform signal detection. The apparatus may be coupled to a baseband integrated circuit (BBIC) of a mobile station radio (MS). The apparatus may include a storage module to store data associated with a signal received by an antenna of the MS. The apparatus may further include a communication detection module to generate a received signal strength indicator (RSSI) for the signal while the BBIC is in a sleep mode, and provide the RSSI to a microcontroller unit (MCU) of the MS, wherein the storage module is to provide the data to the BBIC based on the RSSI indicating that a received signal strength of the signal exceeds a threshold value.

According to another aspect, an MS may include an antenna, and a BBIC to be in a sleep mode in wake periods of an idle state of the MS. The MS may further include a transceiver coupled to the antenna and the BBIC, the transceiver comprising a communication processing module to receive data associated with signals from the antenna, the signals being received by the antenna during the wake periods, and produce processed data from the received data. The transceiver may further include an MCU to identify a digital mobile radio (DMR) signal or a frequency modulation (FM) signal from the processed data, wherein the MCU is to trigger a wake-up procedure of the BBIC in response to identification of the DMR signal or the FM signal.

According to another aspect, one or more non-transitory, computer-readable storage media may have instructions stored thereon, wherein the instructions, when executed by an MCU of a transceiver of a DMR MS, cause the MCU to perform one or more operations. The operations may include to identify a DMR signal or a FM signal from processed data retrieved from a communication processing module of the MS, the processed data associated with a signal received by the MS during a wake period of an idle state of the MS. The operations may further include trigger a wake-up procedure of a baseband integrated circuit (BBIC) in response to identification of the DMR signal or the FM signal, and cause the communication processing module to provide the processed data to the BBIC.

BRIEF DESCRIPTION OF THE DRAWINGS

For a fuller understanding of the nature and advantages of the disclosed subject matter, reference is made to the following detailed description of embodiments and in connection with the accompanying drawings, in which.

DETAILED DESCRIPTION

The present disclosure relates to radio technology. More specifically, this disclosure describes apparatuses and procedures relating to digital mobile radio (DMR) communication utilizing enhanced transceivers.

The following description and drawings set forth certain illustrative implementations of the subject matter in detail, which are indicative of several ways in which the various principles of the subject matter may be carried out. The illustrative examples, however, are not exhaustive of the many possible embodiments of the disclosure. Other objects, advantages and features of the subject matter disclosed herein are set forth in the proceeding in view of the drawings where applicable.

With the advent of mobile communication devices, the goal of implementing systems that are both battery efficient and support multiple signal protocols have developed. In particular, land mobile radio has experienced the development of mobile station radios (MSs) that support multiple radio protocols while having the goal of battery efficiency to provide longer battery life for the battery-dependent MSs. In terms of the radio protocols, MSs often support both DMR communications and frequency modulation (FM) communications.

Legacy implementations of an MS included a transceiver for transmission and reception of signals via an antenna of the MS, and a baseband integrated circuit (BBIC) to perform radio control functions of the MS. Both the transceiver and the BBIC were required to be in an active mode to detect signals received by the MS. An approach for saving power in these legacy implementations included transitioning the MS to an idle state where certain elements were placed into sleep mode. However, to maintain proper detection of received signals by the MS during the idle state, periodic wake periods are implemented during the idle state that involve transitioning a portion of the elements (including the transceiver and the BBIC) back into an active mode to detect incoming signals of the MS.

The subject matter disclosed herein, including the enhanced transceiver, allows for detection of incoming signals while a BBIC or digital signal processor (DSP) (collectively referred to as "BBIC" throughout this disclosure) remains in a sleep mode. In particular, the transceiver may operate with a microcontroller unit (MCU) of the MS to detect whether there are signals being received by the MS. Accordingly, the BBIC may remain in the sleep mode during the wake periods of the idle state of the MS rather than having to enter an active mode during the wake periods to detect whether there are signals being received by the MS. The sleep mode of the BBIC draws less power than the active mode of the BBIC. Accordingly, power is saved by maintaining the BBIC in the sleep mode for a longer period, thereby extending the battery life of the MS compared to embodiments where the BBIC is required to be in the active mode during the wake periods of the idle state.

Figure 1:
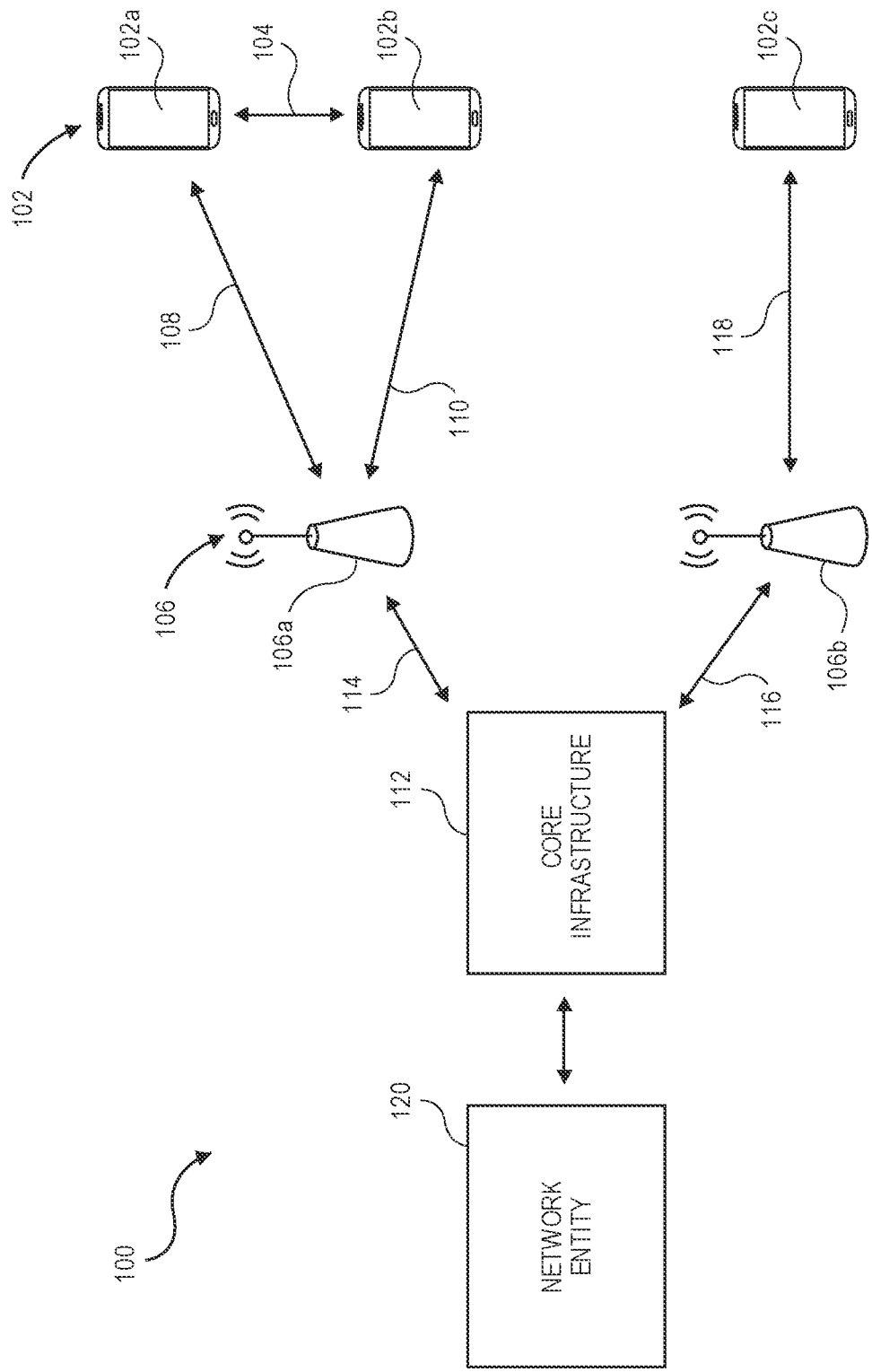
FIG. 1 illustrates an example environment that may implement the MS with enhanced transceiver, in accordance with some embodiments.

FIG. 1 illustrates an example environment 100 that may implement the MS with enhanced transceiver, in accordance with some embodiments. In particular, the environment 100 illustrates components that may form a land mobile radio system. The land mobile radio system, or portions thereof, may support DMR communications, FM communications, or some combination thereof. For example, the land mobile radio system may support communications that are encoded in accordance with DMR protocols or FM approaches.

The environment 100 may include one or more MSs 102. The MSs 102 may comprise DMR MSs in some embodiments. The MSs 102 may include enhanced transceivers in accordance with the embodiments disclosed herein. The MSs 102 may support DMR communications and FM communications. In particular, the MSs 102 may be capable of receiving and/or transmitting signals encoded in accordance with the DMR protocols and FM approaches, and encode and/or decode signals in accordance with the DMR protocols and FM approaches. In other embodiments, each of the MSs 102 may support DMR communications, FM communications, or both DMR communications and FM communications.

One or more of the MSs 102 may be capable of establishing direct communication connections with another of the MSs 102. For example, a first MS 102a may establish a communication connection 104 with a second MS 102b. The communication connection 104 may be a wireless connection and may be established when the first MS 102a and the second MS 102b are within a certain proximity of each other. The first MS 102a and the second MS 102b may exchange communications via the communication connection 104 once the communication connection 104 has been established.

The environment 100 may further include one or more base stations (BSs) 106, which may also be referred to as repeaters. The BSs 106 may receive communications from a remote device and transmit the communications to another remote device. For example, the BSs 106 may receive a communication from one of the MSs 102 and transmit the communication to one or more of the other MSs 102, may receive a communication from one of the MSs 102 and transmit the communication to a core infrastructure (as described below), may receive a communication from a core infrastructure and transmit the communication to one or more of the MSs 102, or some combination thereof.

Each of the BSs 106 may provide for communication connections to be established by the MSs 102 when the MSs 102 are within a certain proximity of the BSs 106. For example, the first MS 102a may establish communication connection 108 with a first BS 106a, and the second MS 102b may establish communication connection 110 with the first BS 106a. The communication connection 108 and the communication connection 110 may be wireless connections. The first BS 106a may provide for communication between the first MS 102a and the second MS 102b when the first MS 102a and the second MS 102b are not within a proximity of each other to communicate directly. For example, the first MS 102a and the second MS 102b may utilize the communication connection 108, the communication connection 110, and the first BS 106a to exchange communications.

The environment 100 may further include one or more core infrastructures, such as core infrastructure 112. The core infrastructure 112 may facilitate communication between multiple BSs 106. For example, the core infrastructure 112 may have a communication connection 114 with the first BS 106a and a communication connection 116 with a second BS 106b in the illustrated embodiment. The communication connection 114 and the communication connection 116 may comprise wireless connections, wired connections, or some combination thereof. The first BS 106a and the second BS 106b may exchange communications via the communication connection 114, the communication connection 116, and the core infrastructure 112. The ability to exchange communications between MSs 102 with communication connections to different BSs 106. For example, a third MS 102c may establish communication connection 118 with the second BS 106b. The first MS 102a and the third MS 102c may exchange communications via the communication connection 108, the first BS 108a, the communication connection 114, the core infrastructure 112, the communication connection 116, the second BS 106b, and the communication connection 118. The core infrastructure 112 may further generate communications that may be transmitted via the BSs 106 to one or more of the MSs 102, may provide for utilization of resources of the core infrastructure 112 by the MSs 102, or some combination thereof.

The environment 100 may further include a network entity 120. The network entity 120 may be coupled to the core infrastructure 112. The network entity 120 may comprise a local area network (LAN), a wide area network (WAN), or another data transmission network. The network entity 120 may provide for utilization of resources by the core infrastructure 112 and/or the MSs 102. Further, the network entity 120 may generate communications that may be transmitted to one or more of the MSs 102.

The components within the environment 100 may implement procedures for communication among the devices. For example, the MSs 102 may switch among states during operation, where the different states may involve different operations of the MSs 102. In particular, each of the MSs 102 may switch among a transmission (TX) state, a reception (RX) state, and an idle state.

In the TX state, the MSs 102 may be configured for transmission of communications. In particular, a radio frequency transceiver transmitter channel (RF Tx) and a BBIC of the MSs 102 may be in an active mode to allow for transmission of communications from the MSs 102. In some embodiments, the MSs 102 may be in the TX state for five percent of the operation time of the MSs 102. In other embodiments, the amount of time that the MSs 102 is in the TX state may vary from five percent.

In the RX state, the MSs 102 may be configured for reception of communications. In particular, a radio frequency transceiver receiver channel (RF Rx) and the BBIC of the MSs 102 may be in an active mode to allow for reception of communications by the MSs 102. In some embodiments, the MSs 102 may be in the RX state for five percent of the operation time of the MSs 102. In other embodiments, the amount of time that the MSs 102 is in the RX state may vary from five percent.

In the idle state, the MSs 102 may be configured to maintain one or more components of the MSs 102 in a sleep mode. When placed in the sleep mode, each component in sleep mode may disable and/or suspend certain operations of the component. A power draw of the component in sleep mode is lower than when the component is in active mode. Accordingly, maintaining the components in sleep mode reduces the power draw from a battery of the MSs 102, which may extend the operation time of the MSs 102 for an amount of charge of the battery. In some embodiments, the MSs 102 may be in the idle state for ninety percent of the operation time of the MSs 102. In other embodiments, the amount of time that the MSs 102 is in the idle state may vary from ninety percent.

While in the idle state, the MSs 102 may still receive communications from the other MSs 102 and/or the BSs 106. Missing received communications is undesirable, so certain components of the MSs 102 may be transitioned to the active mode for periods of time (referred to as "wake periods") to detect any communications received by the MSs 102. In particular, an MCU and a transceiver of the MSs 102 may be transitioned to the active mode during the wake periods to detect any communications received by the MSs 102, while a BBIC of the MSs 102 may be maintained in the sleep mode during the wake periods. Having the BBIC in sleep mode saves power versus the legacy approaches to the wake periods where the MCU, the transceiver, and the BBIC of a legacy MS were required to be in the active mode during the wake periods to detect any communications received by the legacy MS. The ability to allow the BBIC to remain in sleep mode during the wake periods is facilitated by the enhanced transceivers described throughout this disclosure.

While the environment 100 illustrates one implementation of a land mobile radio system, it is to be understood that other implementations of land mobile radio systems may include more or fewer components than illustrated in the environment 100. For example, the network entity 120, the core infrastructure 112, and/or the BSs 106 may be omitted in some other implementations of a land mobile radio system. Further, the implementation of the MSs 102 with the enhanced transceiver is not limited to land mobile radio systems and may be implemented in other radio communication systems, such as other radio communication systems that may support DMR communications, FM communications, or both DMR communications and FM communications.

Figure 2:
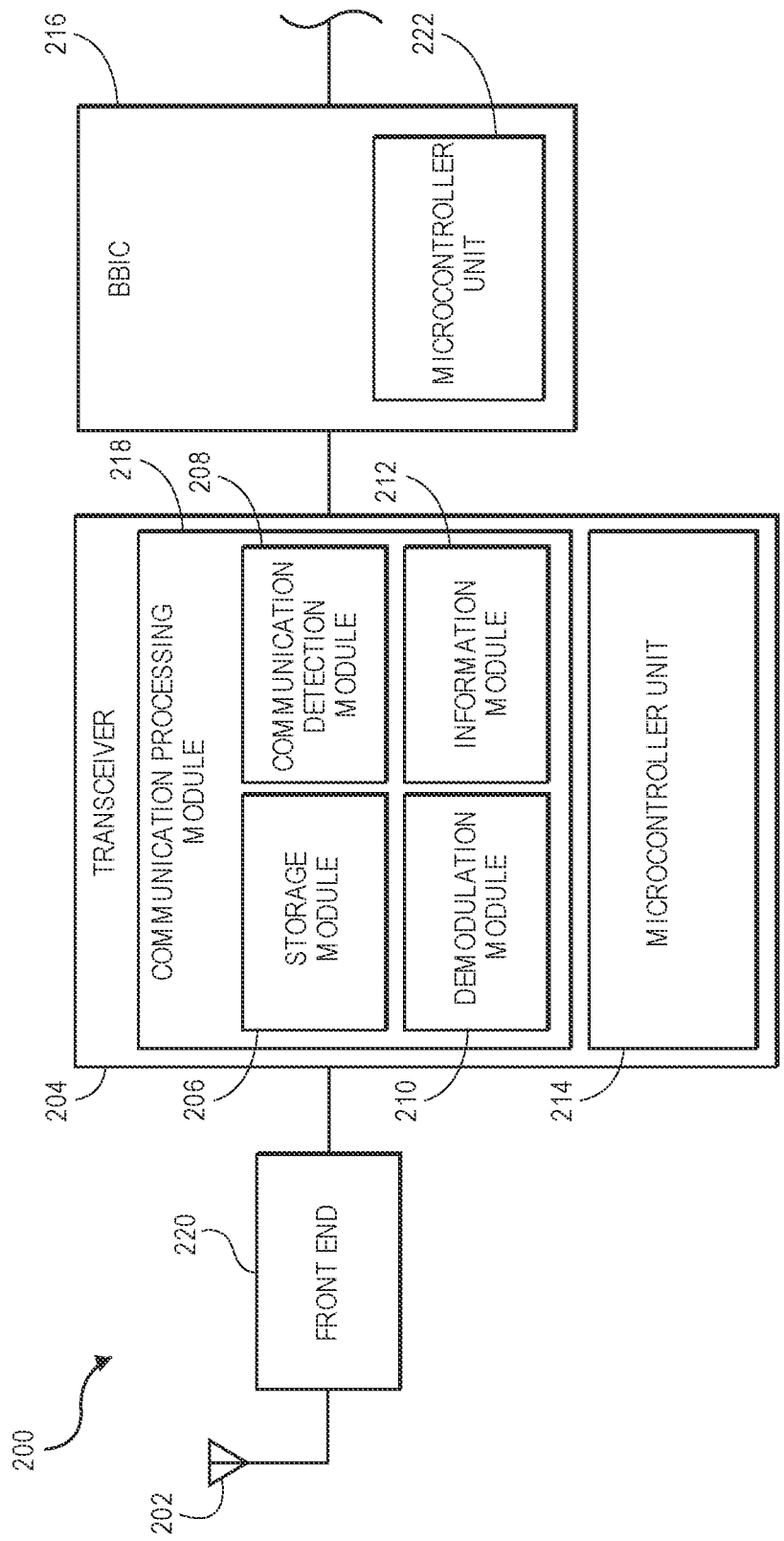
FIG. 2 illustrates a portion of an example MS with enhanced transceiver, in accordance with some embodiments.

FIG. 2 illustrates a portion of an example MS 200 with enhanced transceiver, in accordance with some embodiments. In particular, FIG. 2 illustrates a simplified diagram illustrating some components of the MS 200 related to the subject matter in this disclosure. It is to be the understood that the MS 200 may include additional components and connections implemented in wireless communication devices. Further, the portion of the MS 200 may be included in any of the MS 102 (FIG. 1).

The MS 200 may include an antenna 202. The antenna 202 may utilized for transmission and reception of signals by the MS 200. In other embodiments, the MS 200 may include more than one antenna, where a portion of the antennas may be utilized for transmission of signals and another portion of the antennas may be utilized for reception of signals.

The MS 200 may further include a frontend module 220 coupled to the antenna 202. The frontend module 220 may include one or more discrete devices. For example, the frontend module 220 may include one or more power amplifiers (PAs), RF switches, band filters, low-noise-amplifiers, or some combination thereof. Signals received by the antenna 202 may propagate to the frontend module 220 for processing by the discrete devices.

The MS 200 may further include a transceiver 204 coupled to the frontend module 220. The transceiver 204 may manage transmission and reception of signals via the antenna 202. For example, the transceiver 204 may schedule transmissions via the antenna 202. Further, the transceiver 204 may detect signals received by the antenna 202.

The transceiver 204 may include a receiver channel. In particular, the transceiver 204 may include an RF Rx. The RF Rx may comprise a flexible bandwidth direct conversion receiver. The flexible bandwidth direct conversion receiver may include a highly linear quadrature down-converter, a pair of single pole programmable low-pass filters, and a pair of highly dynamic-range sigma-delta analog-to-digital (AD) converters in some embodiments. Further, the flexible bandwidth direct conversion receiver may perform digital signal processing functions.

The transceiver 204 may further include a communication processing module 218. The communication processing module 218 may include a storage module 206. The storage module 206 may store data associated with signals received by the transceiver 204. For example, the storage module 206 may store data associated with signals received by the transceiver 204 from the antenna 202. In some embodiments, the storage module 206 may further store a test pattern, as described further throughout this disclosure. The storage module 206 may operate as a buffer storing the data to be accessed at some time after reception of the signals.

The communication processing module 218 may further include a communication detection module 208. The communication detection module 208 may facilitate detection of communications received by the transceiver 204. In particular, the communication detection module 208 may facilitate detection of signals associated with communications received by the transceiver 204. The communication detection module 208 may facilitate detection of DMR signals, other time division multiple access (TDMA) frequency shift keying (FSK) signals, analog FM signals, or some combination thereof. The detection of the signals may include calculation of a received signal strength indicator (RSSI) and determination of whether the received signal strength exceeds a threshold value based on the RSSI. Further, the detection of the signals may include frame synchronization (SYNC) code correlation for DMR signals and other TDMA FSK signals. For detection of the analog FM signals, fast Fourier transform (FFT)-based spectrum estimation may be employed. The detection of the signals may be robust, and may be immune from low signal-to-noise ratios (SNR), carrier frequency offsets, and adjacent channel interference.

The communication detection module 208 may further include a demodulation module 210. The demodulation module 210 may facilitate demodulation of signals received by the transceiver 204. In particular, the demodulation module 210 may apply demodulation methodologies and/or filtering to facilitate demodulation of the signals. The demodulation methodologies and/or filtering applied by the demodulation module 210 may depend on the type of signal to which the methodologies and/or filtering is being applied. For example, an arctan first methodology, a differentiator-first with phase increment over one sample methodology, or a differentiator-first with phase increment over one symbol duration methodology may be applied. Further, low-pass filtering may be applied to analog FM signals in some embodiments. Pulse shape filtering may be applied to DMR signals and other TDMA FSK signals in some embodiments. The pulse shape filtering may be programmable in some embodiments. For example, the pulse shape filtering for DMR/4FSK signals may load a square root raised cosine (SRRC) filter profile. The pulse shape filtering for P25/C4FM may load a root raised cosine (RRC) filter profile. The roll off factor of the filters may be 0.2.

The communication detection module 208 may further include an information module 212. The information module 212 may produce and/or store information associated with a signal received by the transceiver 204, where the information may be utilized for processing of the signal. For example, the information module 212 may perform cross-correlation operations for data associated with a signal and store the result of the cross-correlation operations, may determine a timing error associated with the data and store the timing error, may store a digital processing (DP) output result, or some combination thereof. The storage module 206, the communication detection module 208, the demodulation module 210, and the information module 212 may be included in a RF Rx of the transceiver 204.

The transceiver 204 may further include an MCU 214. The MCU 214 may facilitate performance of one or more of the operations performed by the transceiver 204. For example, the MCU 214 may operate with the communication detection module 208 to detect the signals. Further, the MCU 214 may operate with the demodulation module to determine which methodology and/or filtering is to be applied to the data associated with the signals, and may operate with the information module 212 to produce some of the information and utilize the information for processing of the signal. The MCU 214 may include, or may be coupled to, one or more computer-readable media that have instructions stored thereon, wherein the MCU 214 may perform one or more operations in response to execution of the instructions by the MCU 214.

The MS 200 may further include a BBIC 216. The BBIC 216 may be coupled to the transceiver 204. The BBIC 216 may perform signal conversion for signals received from the transceiver 204. For example, the BBIC 216 may decode signals received from the transceiver 204. The BBIC 216 may include an MCU 222 that facilitates the signal conversion for the signals. The MCU 222 may include, or may be coupled to, one or more computer-readable media that have instructions stored thereon, wherein the MCU 222 may perform one or more operations in response to execution of the instructions by the MCU 222.

Figure 3:
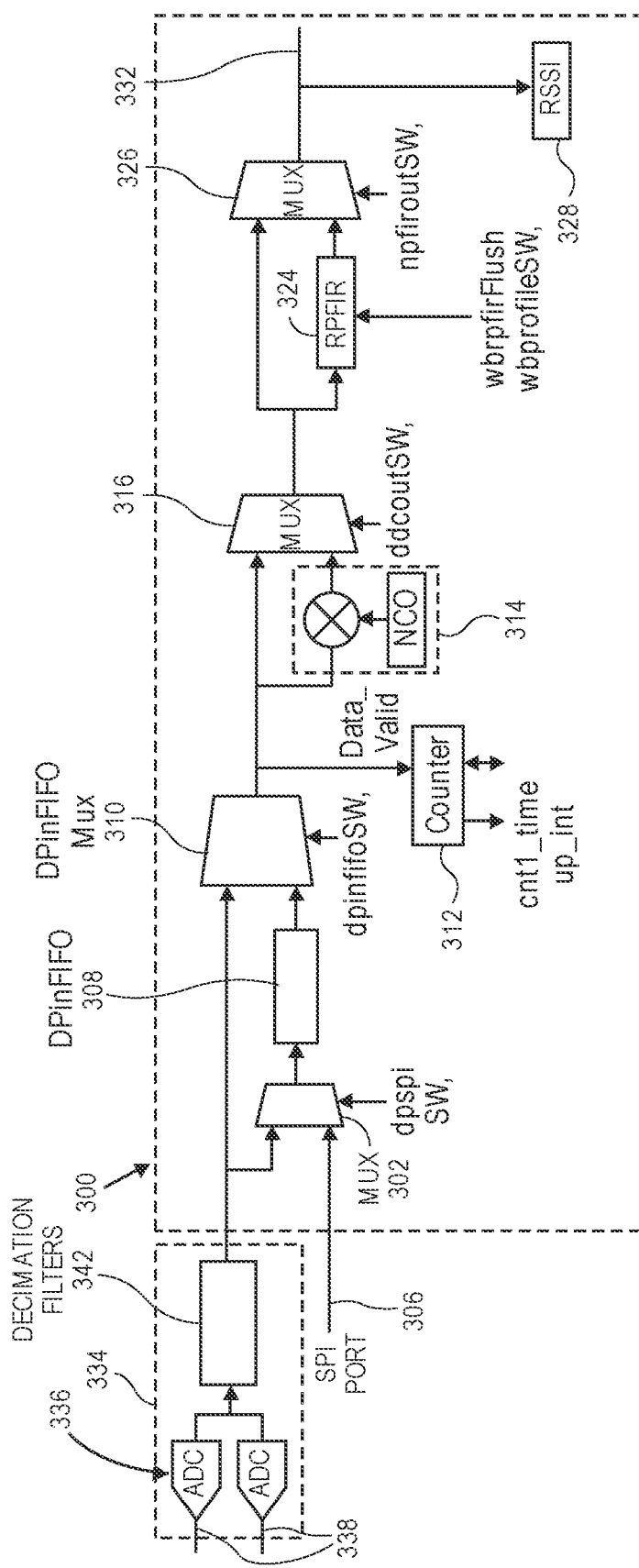
FIG. 3 illustrates a diagram of a first portion of an example communication processing module, in accordance with some embodiments.

FIG. 3 illustrates a diagram of a first portion 300 of an example communication processing module, in accordance with some embodiments. In particular, the components of the first portion 300 illustrated may be implemented in the communication processing module 218 (FIG. 2) within a RF Rx of the transceiver 204 (FIG. 2). For example, a first portion of the components may be included in the storage module 206 and a second portion of the components may be included in the communication detection module 208. Further, FIG. 3 illustrates MS components 334, which may prepare data for the communication processing module. For example, the MS components 334 may be coupled between one or more antennas (such as the antenna 202 (FIG. 2)) of a MS (such as the MSs 102 (FIG. 1)) and the communication processing module. The MS components 334 may generate data for processing by the communication processing module based on signals received by the antenna.

The MS components 334 may include one or more analog-to-digital converters (ADCs) 336. The ADCs 336 may receive as input analog signals received by the antennas and output digital representations of the signals. The ADCs 336 may be coupled to reception paths 338 for receiving data from an antenna in the illustrated embodiment.

The MS components 334 may further include one or more decimation filters and digital correction datapath 342 (referred to as "decimation filters 342"). The decimation filters 342 may be coupled to the output of the ADCs 336 and may receive data output by the ADCs 336. The decimation filters 342 may reduce a sampling rate of the data received from the ADCs 336. The decimation filters 342 may further remove data corresponding to out-of-band signals and noise from the data received from the ADCs 336.

The first portion 300 may include a multiplexer 302. Inputs of the multiplexer 302 may be coupled to an output of the decimation filters 342 and to an input 306 of the transceiver from an MCU (such as the MCU 214 (FIG. 2)). The input 306 may receive a test pattern from the MCU. The multiplexer 302 may further receive a control signal from the MCU that indicates which of data from the decimation filters 342 and data on the input 306 is to be propagated to an output of the multiplexer 302.

The first portion 300 may further include a storage device 308. The storage device 308 may be coupled to the output of the multiplexer 302 and may store data output by the multiplexer 302. The storage device 308 may comprise a first-in, first-out storage device in some embodiments. The storage device 308 may receive write and read commands (such as a write enable trigger and a read enable trigger) from the MCU indicating when the storage device 308 is to store data and when the storage device 308 is to output stored data to an output of the storage device 308.

The storage device 308 may further receive indications of a position where a read pointer is to be located and/or indications of a position where a write pointer is to be located. For example, the storage device 308 may receive indications that the read pointer should be positioned a certain amount of storage positions from the write pointer, the read pointer should be positioned a certain amount of storage positions from a current position of the read pointer, or the read pointer and the write pointer should be positioned at a same location. In some embodiments, the indications may include an indication of a position for the read pointer relative to the current write pointer location, an indication of an amount of data that is to be bypassed by the read pointer, and an indication that the read pointer is be positioned at the same position as the current write pointer location.

In some embodiments, the storage device 308 may have a depth size of at least 4096. Accordingly, the storage device 308 can store a 24 kilosamples per second (ksps) input stream for more than 170 milliseconds (ms). The storage device 308 may have a write enable control bit and a read enable control bit that enable writing and reading, respectively, of the storage device 308. The storage device 308 may further include a status register that indicates how much data is buffered in the storage device 308. The data written to the storage device 308 may be allowed to overflow, although the most recently received 4096 samples may be stored when the data limit of the storage device 308 is met.

The storage device 308 may have a separate write clock and read clock. In some embodiments the write clock may have a frequency of 24 kilohertz (kHz). The read clock may have a frequency greater than the write clock. For example, the read clock may have a frequency that is twice, four times, or eight times as great as the frequency of the write clock. The read clock may be faster than an input data sampling rate of the storage device 308. The storage device 308 and the multiplexer 302 may be included in a storage module (such as the storage module 206 (FIG. 2)) of the communication processing module.

The first portion 300 may further include a multiplexer 310. The multiplexer 310 may have as inputs the output of the decimation filters 342 and the output of the storage device 308. The multiplexer 310 may further receive a control signal from the MCU that indicates which of data output by the decimation filters 342 and data output by the storage device 308 is to be propagated to an output of the multiplexer 310.

The first portion 300 may further include a counter 312. The counter 312 may be coupled to an output of the multiplexer 310 and may count a data valid signal. For example, the counter 312 may count a number of edges or a number of a certain state of the data valid signal. The counter 312 may further receive a counter enable bit from the MCU that indicates whether the counter 312 is to be enabled or disabled. Further, the counter 312 may receive a self-clearing control bit from the MCU, which causes the counter 312 to clear its current value. A value of the counter 312 may be read by the MCU or a BBIC (such as the BBIC 216 (FIG. 2)) of the MS.

The counter 312 may further receive an indication of a counter threshold value from the MCU. When a value of the counter 312 is equal to the threshold value, an interrupt is trigger. The counter 312 may continue to count after the interrupt has been triggered.

In some embodiments, the counter 312 may comprise a 16-bit counter. The counter may be driven by the same read clock utilized by the storage device 308. The counter 312 may continue to count the data valid signal until the value of the counter reaches 65535. Once the value reaches 65535, the counter 312 may maintain the value until the counter is cleared.

The first portion 300 may further include converter components 314. The converter components 314 may include a digital down-converter in some embodiments. The converter components 314 may be coupled to the output of the multiplexer 310 and may remove carrier frequency offset from data received from the output of the multiplexer 310. A direct digital synthesizer (DDS) frequency tuning word (FTW) utilized by the converter components 314 may be 32 bits wide and may be set by the MCU. Further, the datapath in the converter may be reset under the control of the MCU.

The first portion 300 may further include multiplexer 316. The inputs of the multiplexer 316 may be coupled to the output of the multiplexer 310 and to the output of the converter components 314. The multiplexer 316 may receive a control signal from the MCU that indicates which of data received from the multiplexer 310 or data received from the converter components 314 is to be propagated to an output of the multiplexer 316. Accordingly, data output by the multiplexer 310 may bypass the converter components 314 when the control signal from the MCU indicates that the data received from the multiplexer 310 is to be propagated by the multiplexer 316. However, the MCU may avoid bypassing the converter components 314 when a propagation delay of the transceiver has been determined to avoid changes in the propagation delay.

The first portion 300 may further include a Rx programmable finite impulse response filter (RPFIR) component 324. An input of the RPFIR component 324 may be coupled to the output of the multiplexer 316. The RPFIR component 324 may stop adjacent channel interference for data received from the multiplexer 316, may select a wanted channel bandwidth for RSSI measurement, or some combination thereof.

The RPFIR component 324 may support at least two filter profiles that may be applied to data received by the RPFIR component 324. In some embodiments, the RPFIR component 324 may store four filter profiles. The RPFIR component 324 may receive a control signal from the MCU indicating which profile is to be applied by the RPFIR component 324. The RPFIR component 324 may perform passband compensation, may operate as a channel selection filter, or some combination thereof. The datapath of the RPFIR component 324 may be reset under control of the MCU.

The first portion 300 may further include a multiplexer 326. The inputs of the multiplexer 326 may be coupled to the output of the multiplexer 316 and an output of the RPFIR component 324. The multiplexer 326 may receive a control signal from the MCU that indicates which of data received from the multiplexer 316 or data received from the RPFIR component 324 is to be propagated to an output of the multiplexer 326. Accordingly, data from the multiplexer 316 may bypass the RPFIR component 324 when the control signal from the MCU indicates that the data received from the multiplexer 316 is to be propagated.

The first portion 300 may further include RSSI components 328. The RSSI components 328 may be coupled to an output of the multiplexer 326. The RSSI components 328 may accumulate filtered channel power of data received from the multiplexer 326 on a sample by sample basis. The duration time of accumulated samples may be programmable by the MCU. In particular, the duration time may range from 100 microseconds to 10 milliseconds. The number of accumulated samples utilized may be based on an input sampling frequency, a RF bandwidth of the passband of the RPFIR component 324, a number of samples within a certain time period (such as 1.5 milliseconds), or some combination thereof.

The RSSI components 328 may provide an output in the unit of decibels relative to full scale (dBFS), where the output indicates the received signal power within the assigned channel at the antenna coupled to the transceiver. The accumulated power level may be subtracted by the gain in unit of decibels (dB) from an automatic gain control block to obtain the output of the RSSI component. The output of the RSSI components 328 may be accessed by the MCU when the accumulation is manually reset and/or restarted by the MCU. The RSSI output can be applied to measure the noise floor at the antenna port during the initialization phase. In power detecting mode, RSSI accumulation operations can be automatically restarted if the output of the RSSI components 328 does not reach a detection threshold stored by the MCU. The RSSI components 328 may be included in a communication detection module (such as the communication detection module 208 (FIG. 2)) of the communication processing module. The counter 312, the converter components 314, the RPFIR component 324, and the RSSI components 328 may be included in the communication detection module 208 (FIG. 2). An output 332 of the multiplexer 326 may be coupled to a second portion 400 (see FIG. 4) of the transceiver.

Figure 4:
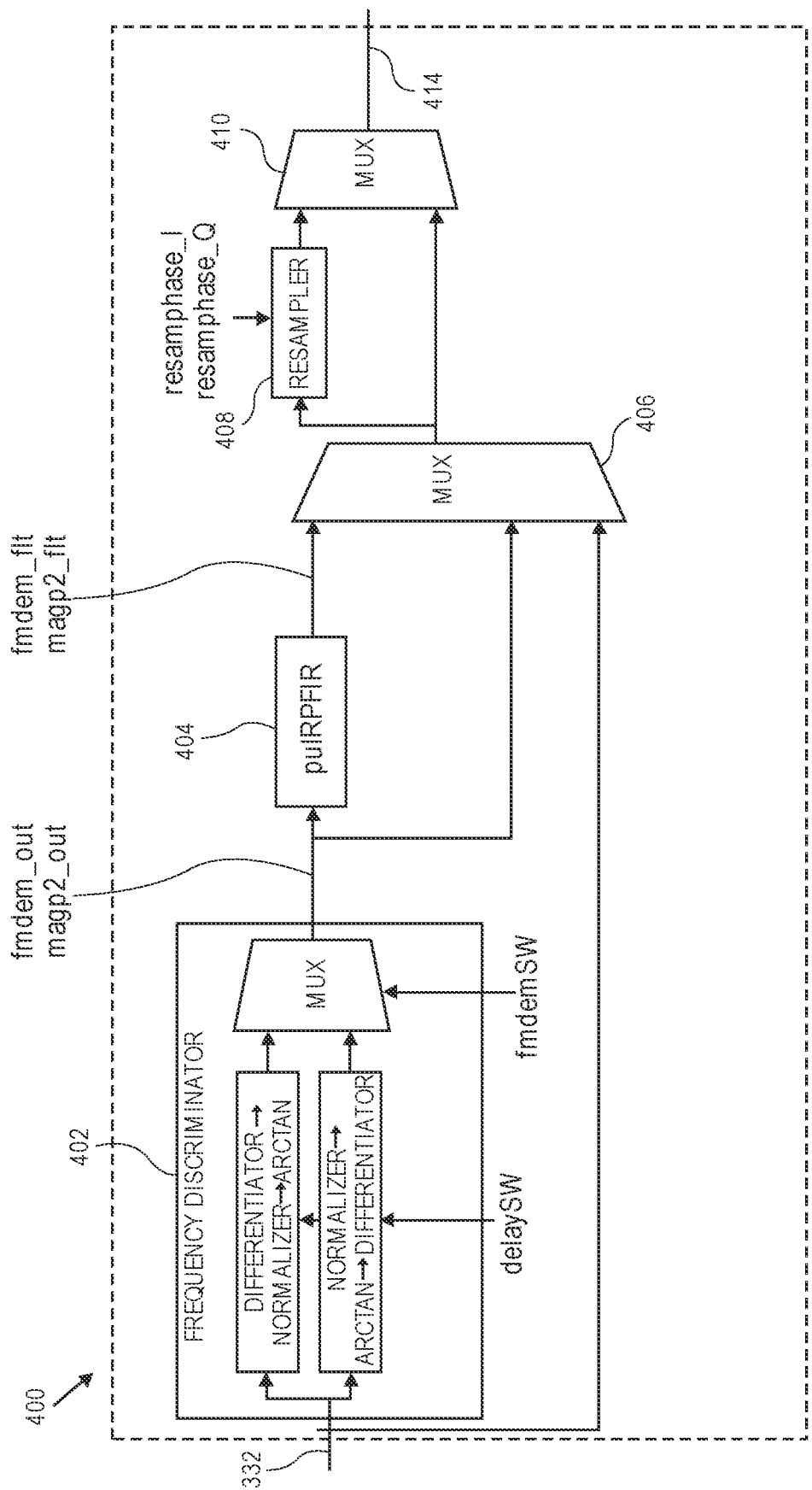
FIG. 4 illustrates a diagram of a second portion of the example communication processing module of FIG. 3, in accordance with some embodiments.

FIG. 4 illustrates a diagram of a second portion 400 of the example communication processing module of FIG. 3, in accordance with some embodiments. In particular, the second portion 400 may be coupled to the output 332 of the first portion 300 (FIG. 3) as an input to the second portion 400.

The second portion 400 may include a frequency discriminator component 402. The frequency discriminator component 402 may be coupled to the output 332. The frequency discriminator component 402 may perform operations that facilitate FM demodulation of data received via the output 332.

The frequency discriminator component 402 may support two types of FM demodulators in the illustrated embodiment. For example, the two types of FM demodulators may include a differentiator-first methodology of FM demodulation, a normalizer-first methodology of FM demodulation, or some combination thereof. The frequency discriminator component 402 may receive an indication of which the FM demodulators is to be utilized from the MCU. A datapath of the frequency discriminator component 402 can be reset by the MCU. Further, the frequency discriminator component 402 may output a sample power of the data received by the frequency discriminator component 402 in addition to the result of the FM demodulation applied to the data.

The second portion 400 may further include a pulse RPFIR component 404. The pulse RPFIR component 404 may be coupled to the output of the frequency discriminator component 402. The pulse RPFIR component 404 may comprise a narrowband filter. The pulse RPFIR component 404 may be programmed by the MCU with multiple different filters to apply to data received from the frequency discriminator component 402. In particular, the pulse RPFIR component 404 may receive an indication of which filter is to be applied from the MCU. In instances where a DMR signal is detected, the pulse RPFIR component 404 may apply a pulse shaping filter. In instances where an FM signal is detected, a low-power filter for FM demodulation to reject noise at higher bands may be applied by the pulse RPFIR component 404. A datapath in the pulse RPFIR component 404 may be reset by the MCU.

The second portion 400 may further include a multiplexer 406. The inputs of the multiplexer 406 may be coupled to the output 332, an output of the frequency discriminator component 402, and an output of the pulse RPFIR component 404. The multiplexer 406 may receive a control signal from the MCU that indicates which of data received from the output 332, data received from the frequency discriminator component 402, or data received from the pulse RPFIR component 404 is to be propagated to an output of the multiplexer 406. Accordingly, data from the frequency discriminator component 402 may bypass the pulse RPFIR component 404 when the control signal from the MCU indicates that the data received from the frequency discriminator component 402 is to be propagated. Further, data from the output 332 may bypass both the frequency discriminator component 402 and the pulse RPFIR component 404 when the control signal from the MCU indicates that the data received from the output 332 is to be propagated.

The second portion 400 may further include a resampler component 408. An input of the resampler component 408 may be coupled to the output of the multiplexer 406. The resampler component 408 may adjust the sampling phase of data received from the multiplexer 406. A resampling phase of the resampler component 408 may be programmable by the MCU.

The second portion 400 may further include a multiplexer 410. The inputs of the multiplexer 410 may be coupled to an output of the resampler component 408 and an output of the multiplexer 406. The multiplexer 410 may receive a control signal from the MCU that indicates which of data received from the multiplexer 406 or data received from the resampler component 408 is to be propagated to an output of the multiplexer 410. Accordingly, data from the multiplexer 406 may bypass the resampler component 408 when the control signal from the MCU indicates that the data received from the multiplexer 406 is to be propagated. In instances where an FM signal is detected, the resampler component 408 may be bypassed. In instances where a DMR signal or a P25 signal is detected, the data from the multiplexer 406 may be directed through the resampler component 408. The frequency discriminator component 402, the pulse RPFIR component 404, and the resampler component 408 may be included in the demodulation module 210 (FIG. 2). An output 414 of the multiplexer 410 may be coupled to a third portion 500 (FIG. 5) of the transceiver.

Figure 5:
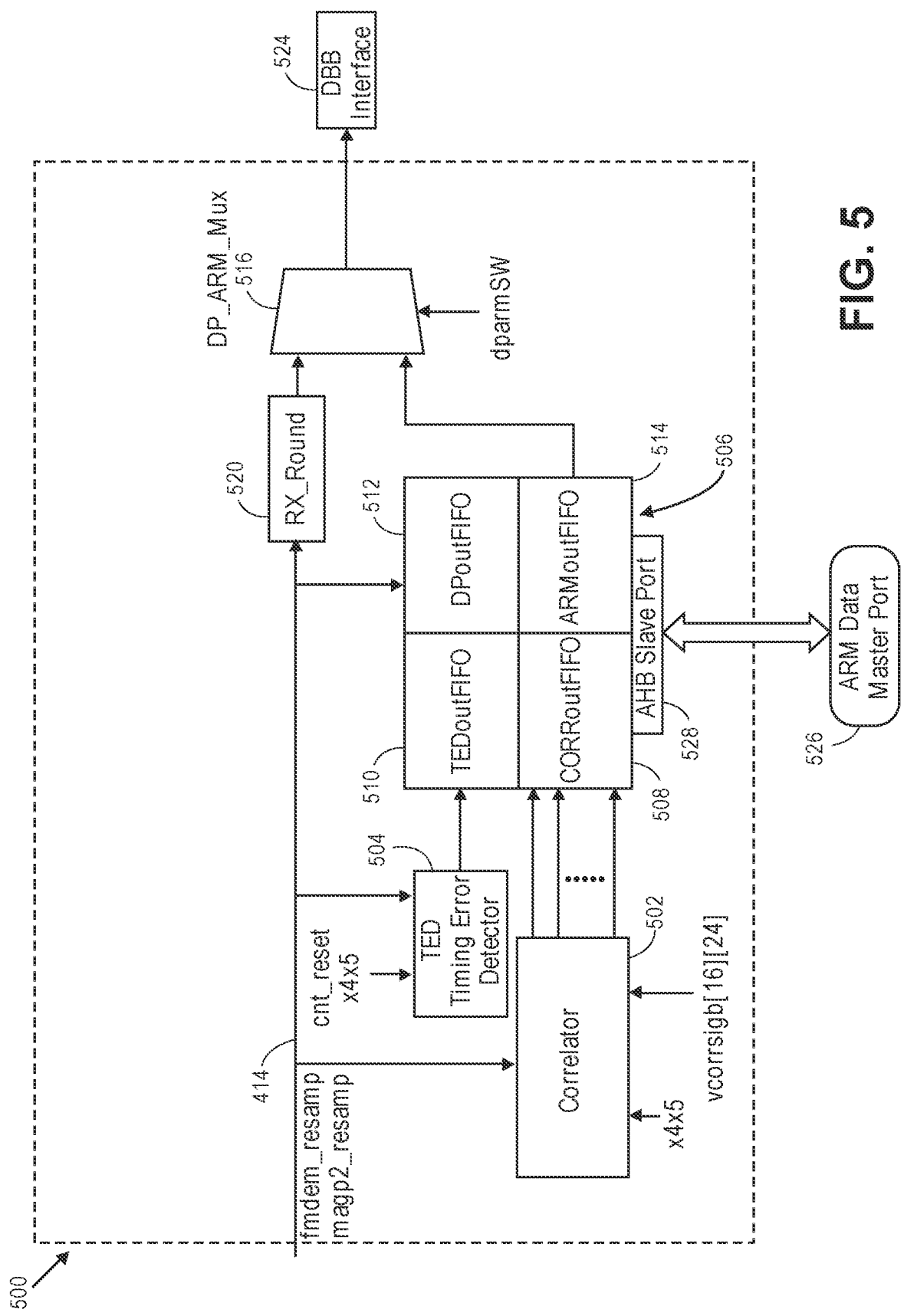
FIG. 5 illustrates a diagram of a third portion of the example communication processing module of FIG. 3, in accordance with some embodiments.

FIG. 5 illustrates a diagram of a third portion 500 of the example communication processing module of FIG. 3, in accordance with some embodiments. In particular, the third portion 500 may be coupled to the output 414 of the second portion 400 (FIG. 4) as an input to the third portion 500.

The third portion 500 may include a correlator component 502. An input of the correlator component 502 may be coupled to an output 414 of the multiplexer 410 (FIG. 4). The correlator component 502 may perform cross-correlation operations on data received via the output 414.

In particular, the correlator component 502 may have two different inputs stream from the output 414. For example, the correlator component 502 may receive the data and the sample power of the data. The correlator component 502 may perform cross-correlation operations between the data and local SYNC codes. In some embodiments, the correlator component 502 may include 14 independent correlation processors operating in parallel. For each one input sample of the data, 14 cross-correlation output samples may be generated by the 14 correlation processors. Each of the correlation processors may be enabled or disabled by the MCU. Each of the correlation processors can be independently loaded with a corresponding SYNC code by the MCU, where each SYNC code may be 24 2-state {−1, +1} symbols in length.

The correlator component 502 may further include a frequency deviation moving average. The moving average may further sum up the continuous 5×24 input samples (frequency deviation). In parallel, 24 samples of the sample magnitude (I^2+Q^2) power input may be summed up to generate a power sum, which may be the corresponding confidence factor for an output of the correlator component 502. The correlator component 502 may output 16 outputs in parallel (or substantially in parallel) in the sampling rate of 24 kHz. The 16 outputs may be 24 bit fixed-point symbols. The correlator component 502 may further receive a control, which is a self-clearing bit to enable a whole correlator engine of the correlator component 502 based on an individual correlator enable bits pattern. The output of the correlator component 502 may not be applicable for FM signals. In some embodiments, the correlator component 502 can support some shorted SYNC code detection.

The third portion 500 may further include a timing error detector (TED) component 504. An input of the TED component 504 may be coupled to the output 414. The TED component 504 may be enabled when a DMR signal is detected. The TED component 504 may track sample timing error for data received via the output 414 based on Gardner algorithms. The TED component 504 may have an up-sampling rate of five. In other embodiments, the TED component 504 may have an up-sampling rate of four. Outputs of the TED component may be divided into five phases and may be attached with three bits of phase information. The TED component 504 may further receive a self-clearing control bit from the MCU that causes the TED component 504 to be cleared.

The third portion 500 may further include a storage device 506. The storage device 506 may be partitioned into multiple areas (which may be referred to as "partitions") where each of the areas may store data received from different components. The inputs of the storage device may be coupled to the output 414, outputs of the correlator component 502, and output of the TED component 504. In other embodiments, the third portion 500 may include multiple storage devices where each of the storage devices may store data received from different components. Where the third portion 500 includes multiple storage devices, each of the storage devices may be coupled to the component providing the data that the storage device is configured to store.

The storage device 506 may include a correlator partition 508. The correlator partition 508 may store data received from the correlator component 502. In particular, the correlator partition 508 may buffer the outputs of the correlator component 502. The correlator partition 508 may be arranged in a first-in, first-out (FIFO) arrangement. The correlator partition 508 may support a maximum depth of 32.

A current buffered data number in the correlator partition 508 may be stored in an advanced high-performance bus (AHB) status register. In some embodiments, the current buffered data number in in the correlator partition 508 may be stored in an advanced extensible interface (AXI) bus, other bus status register. When the buffered data number is equal to a configured threshold, an interrupt may be triggered. The value of the configured threshold may be programmed by the MCU.

An output port of the correlator partition 508 may occupy 16 32-bit AHB addresses. The MCU may read the oldest 24×16 data from the correlator partition 508 during the main routine or during the interrupt service routine (ISR) for the interrupt triggered by the buffered data number being equal to the configured threshold. The reading of all 16 24-bit data from the correlator partition 508 in one clock cycle may be an automatic transaction. When the MCU finishes reading the 16 24-bit data, a status of the correlator partition 508 may be updated with the present value minus 1. Further, the correlator partition 508 may convert the 24 bit data into 32 bit data with sign bit extended to match the 32-bit AHB.

If writing to the correlator partition 508 fills the size of the correlator partition 508 prior to the MCU reading the data, writing to the correlator partition 508 may cause overflow. When the correlator partition 508 is enabled, a data discard event may occur. A data discard indication bit may be set in response to the data discard. The data discard indication bit can be read by the MCU and can be cleared by the MCU.

The storage device 506 may further include a TED partition 510. The TED partition 510 may store data received from the TED component 504. In particular, the TED partition 510 may buffer the outputs of the TED component 504. The TED partition 510 may be arranged in a FIFO arrangement. The TED partition 510 may support a maximum depth of 32.

A current buffered data number in the TED partition 510 may be stored in an AHB status register. When the buffered data number is equal to a configured threshold, an interrupt may be triggered. The value of the configured threshold may be programmed by the MCU.

An output port of the TED partition 510 may occupy one 32-bit AHB address. The MCU may read the oldest 16-bit data from the TED partition 510 during the main routine or during the ISR for the interrupt triggered by the buffered data number being equal to the configured threshold. When the MCU finishes reading the 16-bit data, a status of the TED partition 510 may be updated with the present value minus 1. Further, the TED partition 510 may convert the 16 bit data into 32 bit data with sign bit extended to match the 32-bit AHB.

If writing to the TED partition 510 fills the size of the TED partition 510 prior to the MCU reading the data, writing to the TED partition 510 may cause overflow. When the TED partition 510 is enabled, a data discard event may occur. A data discard indication bit may be set in response to the data discard. The data discard indication bit can be read by the MCU and can be cleared by the MCU.

The storage device 506 may further include a DP partition 512. The DP partition 512 may store data received from the output 414. The DP partition 512 may be arranged in a FIFO arrangement. The DP partition 512 may support a maximum depth of 32.

A current buffered data number in the DP partition 512 may be stored in an AHB status register. When the buffered data number is equal to a configured threshold, an interrupt may be triggered. The value of the configured threshold may be programmed by the MCU.

An output port of the DP partition 512 may occupy two 32-bit AHB addresses. The MCU may read the oldest two 22-bit data from the DP partition 512 during the main routine or during the ISR for the interrupt triggered by the buffered data number being equal to the configured threshold. When the MCU finishes reading the two 22-bit data, a status of the DP partition 512 may be updated with the present value minus 1. Further, the DP partition 512 may convert the 22 bit data into 32 bit data with sign bit extended to match the 32-bit AHB.

If writing to the DP partition 512 fills the size of the DP partition 512 prior to the MCU reading the data, writing to the DP partition 512 may cause overflow. When the DP partition 512 is enabled, a data discard event may occur. A data discard indication bit may be set in response to the data discard. The data discard indication bit can be read by the MCU and can be cleared by the MCU.

The storage device 506 may include an advanced reduced instruction set computer machine (ARM) partition 514. The ARM partition 514 may store data received from the MCU. In particular, the ARM partition 514 may buffer the outputs of the MCU. The ARM partition 514 may receive the data from the MCU via an ARM data master port 526 and an AHB slave port 528. The ARM partition 514 may be arranged in a FIFO arrangement. The ARM partition 514 may support a maximum depth of 32.

The MCU may write one 32-bit data into the ARM partition 514 during the main routine or in response to an ISR. A status of the ARM partition 514 may be updated with the present value plus 1 when the MCU finishes writing the 32-bit data. The current buffered data number in the ARM partition 514 is stored in an AHB status register.

The ARM partition 514 may feed the oldest 16×2 data into a datapath of the transceiver via multiplexer 516 when any valid data is in the ARM partition 514. For each data output to the datapath by the ARM partition 514, a status of the ARM partition is updated with the present value minus 1. A read clock for the ARM partition 514 may be the same read clock utilized by the storage device 308 (FIG. 3) and the counter 312 (FIG. 3). When the status of the ARM partition is decreased to the value of 0, an interrupt may be generated.

The third portion 500 may further include a rounding component 520. The rounding component may support two modes of rounding, which may be specified by a control bit of the MCU. A first mode may be an FSK demodulation mode, where each symbol is mapped to two bits for demodulation. In the first mode, the rounding component 520 may round the input 22-bit I data to 16-bit data, where the 16-bit output Q data is set to the value zero. The second mode is the normal mode. In the second mode, the rounding component 520 rounds the input 22-bit IQ data to 16-bit IQ data. The correlator component 502, the TED component 504, the storage device 506, and the rounding component 520 may be included in the information module 212 (FIG. 2).

The third portion 500 may further include the multiplexer 516. The inputs of the multiplexer 516 may be coupled to the rounding component 520 and the ARM partition 514. The multiplexer 516 may receive a control signal from the MCU that indicates which of data received from the rounding component 520 or data received from the ARM partition 514 is to be propagated to an output of the multiplexer 516. An output of the multiplexer 516 may be coupled to a BBIC (such as the BBIC 216 (FIG. 2)). In particular, the output of the multiplexer 516 may be coupled to the BBIC via a synchronous serial line interface (SSI) port 524.

Figure 6:
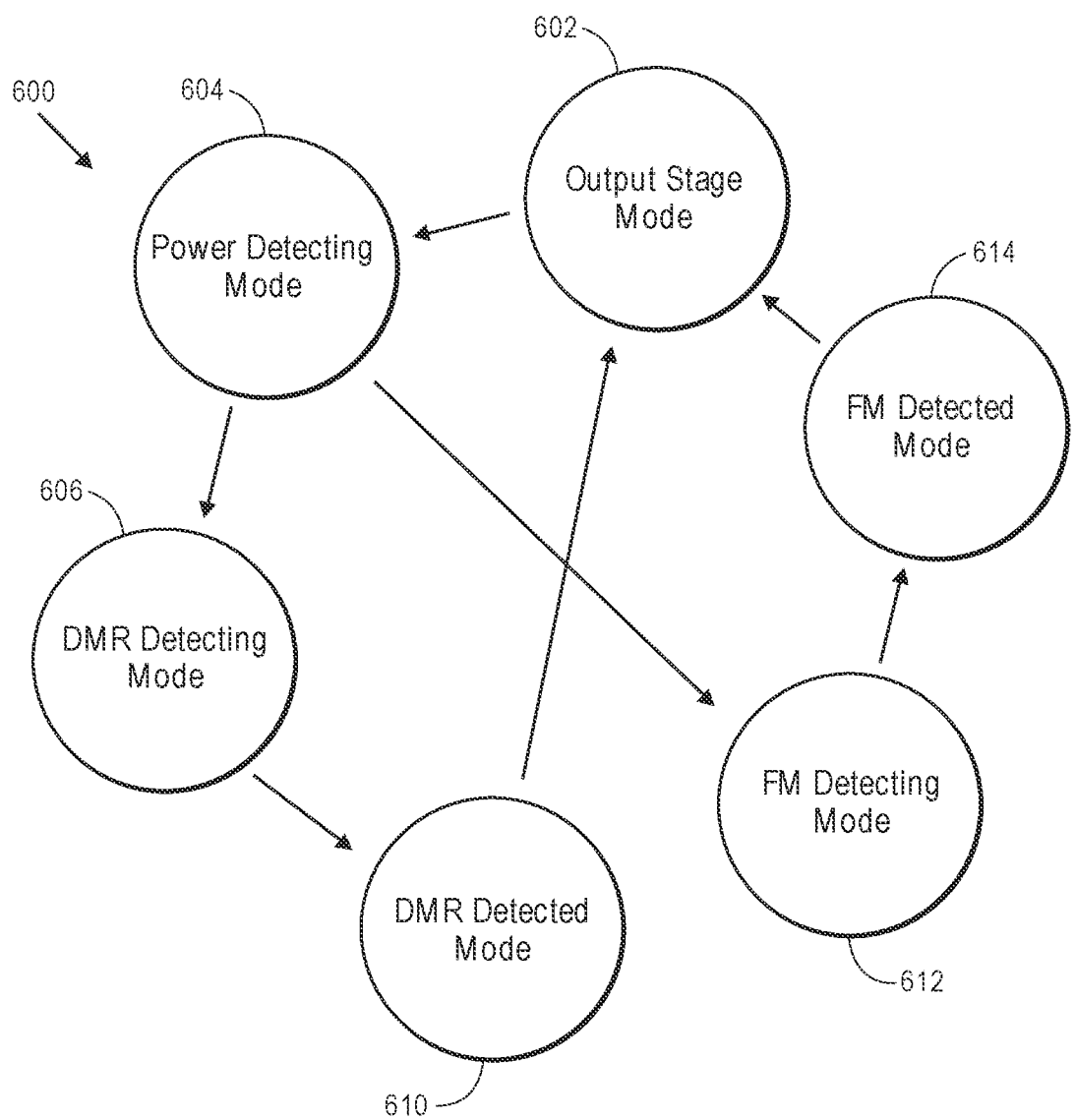
FIG. 6 illustrates an example state diagram that may be employed by a MS, in accordance with some embodiments.

FIG. 6 illustrates an example state diagram 600 that may be employed by an MS, in accordance with some embodiments. In particular, the state diagram 600 includes states that may be employed by the MS 200 (FIG. 2), which can include the portions of the communication processing module as illustrated in FIGS. 3-5.

The state diagram 600 may include an output stage mode 602. In the output stage mode 602, the rounding component 520 (FIG. 5) may be in the normal mode and may be enabled to work alone. The converter components 314 (FIG. 3), the RPFIR component 324 (FIG. 3), and the resampler component 408 (FIG. 4) may be enabled as configured when the output stage mode 602 was entered. The output stage mode 602 may be selected for both wideband cases (such as long term evolution (LTE)) and narrowband cases (such as land mobile radio (LMR) with demodulation off).

While in the output stage mode 602, the communication processing module may provide fine digital adjustment of the receiver channel center frequency performed by the converter components 314. Further, the communication processing module may provide adjacent channel rejection and drop compensation at the corner frequency performed by the RPFIR component 324. The communication processing module may also provide fine digital adjustment of the reception channel sampling phase performed by the resampler component 408. These three functions may be optional and may be manually controlled by serial peripheral interface (SPI) registers. The other functional blocks of the communication processing module can be enabled independently by the SPI, and may be configured independently by the SPI. Therefore, the output stage mode 602 may be fully slaved by the BBIC via the SPI.

The states may further include a power detecting mode 604. The power detecting mode 604 may be enabled at the beginning of a detection cycle time of a wake period in the idle state of the MS. In the power detecting mode 604, some of the components of the communication processing module are in a sleep mode or turned off. For example, the demodulation module 210 (FIG. 2) and the information module 212 (FIG. 2) may be in a sleep mode or turned off in the power detecting mode 604.

The storage device 308 (FIG. 3) and the counter 312 (FIG. 3) may be initially cleared during the power detecting mode 604. After the storage device 308 and the counter 312 have been cleared, writing control of the storage device 308 may be enabled. In particular, the write enable trigger of the storage device 308 may be set.

The RPFIR component 324 (FIG. 3) may be enabled in the power detecting mode 604. The RPFIR component 324 may be utilized to select the wanted channel bandwidth in the frequency domain for RSSI. A filter profile loaded in the RPFIR component 324 may decide the bandwidth giving the sampling frequency. Accordingly, the input data stream may be input through the external input 322, may be filtered by the RPFIR component 324, and may be provided to the RSSI components 328.

If the RSSI components 328 indicate that the received signal level is above the detection threshold, an interrupt is generated by the RSSI components 328 and transmitted to the MCU. In response to receiving the interrupt, the MCU may cause an ISR to be performed. In particular, two optional operations can be applied in the ISR.

For the first operation, if the wake period is configured to depend only on power detecting, the MCU may wake-up the BBIC if the measured channel power level is above the configured threshold. This operation can be applied for FM, DMR, trans European trunked radio access (TETRA), and wideband (LTE) cases. In other embodiments, this operation may not be applied to the wideband (LTE) cases.

For the second operation, if the wake period is configured to depend on SYNC detection for DMR, the communication processing module may be transitioned to DMR detecting mode 606, if it has not already been entered. The datapath of the RPFIR component 324 may be reset.

The states may further include the DMR detecting mode 606. In the DMR detecting mode 606, the writing control of the storage device 308 may be enabled. In particular, the write enable trigger of the storage device 308 may be set. Each input sample received by the communication processing module may be buffered by the storage device 308. The read control of the storage device 308 may be disabled in the DMR detecting mode 606.

The multiplexer 310 may select the data from the decimation filters 342 to be propagated to the output of the multiplexer 310. Accordingly, an input of the communication processing module may be directly fed into the converter components 314 while the value of the FTW is set to zero. The output of the converter components 314 may be fed into the RPFIR component 324 to stop adjacent channel interference. The output of the RPFIR component 324 may be fed into a component external to the communication processing module (such as a gain slicer) which drives the frequency discriminator component 402. The frequency discriminator component 402 may output the FM demodulator output and the sample power of the data input to the frequency discriminator component 402.

The FM demodulator output and the sample power are fed into the two paths of the pulse RPFIR component 404. The pulse RPFIR component 404 may apply a single filter profile when a DMR signal has been detected and the input sample rate is 24 ksps. The outputs of the pulse RPFIR component 404 may be fed into the resampler component 408, which may have a resampler timing phase that is set to zero.

The outputs of the resampler component 408 may be fed into the correlator component 502. The outputs of the correlator component 502 may be fed into the correlator partition 508 (FIG. 5) of the storage device 506, which buffers outputs. The output of the correlator partition 508 may not be provided to the SSI port 524 (FIG. 5) in the DMR detecting mode 606. However, the output of the correlator partition 508 may be configurable by the SPI for debugging purposes.

During the DMR detecting mode 606, operations associated with the ISR triggered in the power detecting mode 604. In the ISR, the MCU reads, via the AHB, both the correlation partition 508 and the DP partition 512 (FIG. 5). The MCU may compare the output with a configured threshold. The MCU will attempt to determine a correct SYNC and peak position for the output. If a correct SYNC and peak position are determined, the MCU may determine a carrier frequency offset (CFO) estimation, a sample timing error estimation, and a DMR burst head index estimation for the output. In some embodiments, the DMR burst head index may be determined indirectly due to propagation delay between the storage device 308 and the correlator component 502. The propagation delay may be determined via a DMR propagation delay test mode of the communication processing module.

With the exceptions of the features described in relation to the DMR propagation delay test mode, the configuration of the components in the DMR propagation delay test mode may be the same as in the DMR detecting mode 606. In the DMR propagation delay test mode, the MCU may take control of the communication processing module and bypass the MS components 334 by causing the multiplexer 302 to propagate data received on input 306 to an output of the multiplexer 302. Further, the MCU may clear the read pointers of the storage device 308 and then load a test pattern into the storage device via the input 306 and the multiplexer 302. When the DMR propagation delay test mode is exited, the MCU may reset the counter 312 and the read pointer of the storage device 308 to the values when the DMR propagation delay test mode 608 was entered.

Once the initial configuration of the DMR propagation delay test mode has been completed, the MCU may enable read control of the storage device 308. The correlator component 502 may perform the same operations on the data read from the storage device 308 as it performs during the DMR detecting mode 606. The correlator component 502 feeds a sample at a time into the correlator partition 508 and the MCU will search for the correlation peak in the samples until an expected peak is located. Once the MCU identifies the peak, the MCU may read the value of the counter 312, which may be designated as the SYNC index plus the propagation and detection delay. The SYNC index can implement following configuration changes in the datapath from the storage device 308 to the correlator component 502, such as changes to the interrupt threshold value of the correlator partition.

The SYNC index plus the propagation and detection delay may be utilized to determine a location of the read pointer of the storage device 308. For example, the DMR burst head index estimation obtained in the DMR detecting mode 606 may be equal to the SYNC index plus the propagation and detection delay, which may be applied to the storage device 308 as the buffer depth for positioning of the read pointer relative to the write pointer.

After the DMR SYNC is found, the MCU may trigger wake-up of the BBIC and prepare to transition to DMR detected mode 610. Prior to transitioning to the DMR detected mode 610, the MCU may perform one or more operations. For example, the MCU may disable and/or mask a monitor-detecting timer time-up interrupt. Further, the MCU may disable other SYNC code correlation engines in the correlator component 502, leaving the detected SYNC code enabled.

The MCU may further load the DMR burst head index estimation into the storage device 308 if the propagation delay from the multiplexer to the correlator partition 508 is known, where the DMR burst head index indicates a position that the read pointer of the storage device 308 is to be located relative to the write pointer of the storage device 308. The read pointer may be moved to the indicated position on the next positive edge of the write clock of the storage device 308. The MCU may further load the CFO estimation into the converter components 314 as the FTW to remove the CFO from the data received by the converter components 314. Further, the MCU may load the sample timing error estimation into the resampler component 408 to remove the timing error.

The MCU may further cause the multiplexer 310 to propagate the output of the storage device 308 to the output of the multiplexer 310. Further, the MCU may reset the datapath of the communication processing module, with the exception of the storage device 308. The MCU may clear the value of the counter 312. Further, the MCU may initiate a wake-up procedure of the BBIC by toggling a wake-up trigger of the BBIC. The MCU may monitor the BBIC to determine once the wake-up procedure of the BBIC has completed, then may transition the communication processing module to the DMR detected mode.

If DMR SYNC fails to be detected by the time a monitor-detecting time-up interrupt is received, the MCU may transition the transceiver to sleep mode, which may comprise the idle state of the MS outside of the wake periods.

The states may further include the DMR detected mode 610. The DMR detected mode 610 may be entered after a DMR detecting mode 606 cycle where a DMR SYNC was identified. The MCU may cause reading of the storage device 308 to start at the beginning of the DMR detected mode 610.

The data read from the storage device 308 may pass through components of the communication processing module, which may apply operations to the data. In particular, the converter components 314 may remove the CFO estimation from the data. Further, the RPFIR component 324 may reject adjacent channel interference from the data. The frequency discriminator component 402 may output the result of the demodulation of the data. The pulse RPFIR component 404 may filter the data received by the pulse RPFIR component 404. The resampler component 408 may resample the filtered data received from the pulse RPFIR component 404 with the resample phase of the sample timing error estimation. The correlator component 502 may perform operations with the detected SYNC code and may generate one output sample for each corresponding input sample, the outputs to be provided to the correlator partition 508.

The TED component 504 may be enabled in the DMR detected mode 610. The TED component 504 may detect a residual sampling timing error for the data. Further, the TED component 504 generates one output sample for each corresponding input sample, the output samples to be provided to the TED partition 510. The TED component 504 may further output five phase outputs for the sampling rate of 24 kilohertz.

The DP partition 512 may buffer data received from the rounding component 520. Further, the correlator partition 508 may buffer data received from the correlator component 502. The TED partition 510 may buffer data received from the TED component 504. The multiplexer 516 may propagate either the output of the ARM partition 514 or the output of the rounding component 520 to the output of the multiplexer 516 based on an indication received from the MCU, the output of the multiplexer 516 being provided to the SSI port 524. The rounding component 520 may round inputs to 16 bits as signed data.

The MCU may read data from the DP partition 512, the correlator partition 508, and the TED partition 510 via the AHB. Based on the data read, the MCU can obtain more accurate SYNC correlation peak, residual CFO estimation, and residual sampling timing error. In some embodiments, the MCU can demodulate the current burst and generate demodulated bits to the SSI port 524 via the ARM partition 514.

The DMR detected mode 610 may be ceased as the reception enable of the BBIC is dis-alerted. In particular, the idle state of the transceiver is exited with the DMR signal being detected. When the reception enable is alerted again, the communication processing module may transition to the output stage mode 602 with the storage device 308 disabled.

The stages may further include an FM detecting mode 612. The FM detecting mode may follow the power detection mode 604. The FM detecting mode 612 may detect analog FM signals. Certain components of the communication processing module may be disabled in the FM detecting mode. For example, the pulse RPFIR component 404 and the resampler component 408 may be disabled and bypassed in the FM detecting mode. Further, the correlator component 502, the correlator partition 508, the TED component 504, the TED partition 510, and the ARM partition 514 may be disabled.

In the FM detecting mode 612, the multiplexer 302 may propagate data from the decimation filters 342 to the output of the multiplexer 302, thereby feeding the data from the decimation filters 342 to the storage device 308. The storage device 308 may buffer the data received from the decimation filters 342. The multiplexer 310 may also propagate the data from the decimation filters 342 to an output of the multiplexer, thereby feeding the data to the converter components 314 that are set with FTW value of zero. The output of the converter components 314 may be provided to the RPFIR component 324, which rejects the adjacent channel interference. The output of the RPFIR component 324 may be provided to an external component (such as the gain slicer), which drives the frequency discriminator component 402. The frequency discriminator component 402 outputs the result of the demodulation of the data. The pulse RPFIR component 404 and the resampler component 408 may be bypassed, and the output of the frequency discriminator component 402 is fed into the DP partition 512. In some embodiments, only the DP partition 512 may be enabled in the FM detecting mode 612. The DP partition 512 and the interrupt of the DP partition 512 may operate similar to the DP partition 512 and the interrupt of the DP partition 512 from the DMR detecting mode 606.

In the FM detecting mode 612, the MCU may read the data from the DP partition 512 after a frame of data is ready for reading. The MCU may perform a real FFT operation for every received 16 data inputs. The 16 data inputs may be conjugated with the previous 48 buffered data inputs to compose 64 FFT input data. The MCU may determine the power of each FFT bin generated by the MCU FFT routine, and may process as FM detection algorithm inputs.

After the MCU detects an FM signal received by the transceiver, the MCU may obtain the FM CFO estimation based on averaging 64×8 data inputs. Further, the MCU may obtain buffered data length of the storage device 308. In response to the MCU detecting an FM signal, the MCU may trigger a wake-up procedure of the BBIC and prepare to transition the communication processing module to an FM detected mode 614.

Prior to entering the FM detected mode 614, the MCU may perform certain operations. For example, the MCU may load the CFO estimation into the converter components 314 as the FTW to remove the CFO. Further, the MCU may load the buffered data length into the storage device 308 as amount of storage positions that a read pointer of the storage device 308 is to be moved from a current position of the read pointer. The position of the read pointer may be updated at the next positive edge of the data valid, as received by the counter 312.

The MCU may further switch the multiplexer 310 to be propagating the output of the storage device 308 to the output of the multiplexer 310. The MCU may reset the datapath of the communication processing module, with the exception of the storage device 308, and clear the counter 312. Further, the MCU may initiate a wake-up procedure of the BBIC by toggling a wake-up procedure of the BBIC. The MCU may monitor the BBIC to determine once the wake-up procedure of the BBIC has completed, then may transition the communication processing module to the FM detected mode.

If an FM signal fails to be detected by the time a monitor-detecting time-up interrupt is received, the MCU may transition the transceiver to sleep mode, which may comprise the idle state of the MS outside of the wake periods.

The states may further include the FM detected mode 614. Upon transition to the FM detected mode 614, the MCU may cause the reading of the storage device 308 to be initiated. The read clock of the storage device 308 may be twice, four times, or eight times the frequency of the write clock of the storage device 308, where the write clock of the storage device may be 24 kilohertz, 48 kilohertz, or 96 kilohertz.

The data read from the storage device 308 may pass through components of the communication processing module, which may apply operations to the data. For example, the converter components 314 may remove the CFO estimation from the data. Further, the RPFIR component 324 may reject adjacent channel interference. The frequency discriminator component 402 may output the result of the demodulation applied to the data. The pulse RPFIR component 404 may filter the data received from the frequency discriminator component 402 with a low-pass filter profile loaded. The rounding component 520 may round the data to 16 bits as signed data. The multiplexer 516 may propagate the data received from the output of the rounding component 520 to the output of the multiplexer 516, thereby providing the data to the SSI port 524.

The FM detected mode 614 may be ceased as the reception enable of the BBIC is dis-alerted. In particular, the idle state of the transceiver is exited with the FM signal being detected. When the reception enable is alerted again, the communication processing module may transition to the output stage mode 602 with the storage device 308 disabled.

Figure 7:
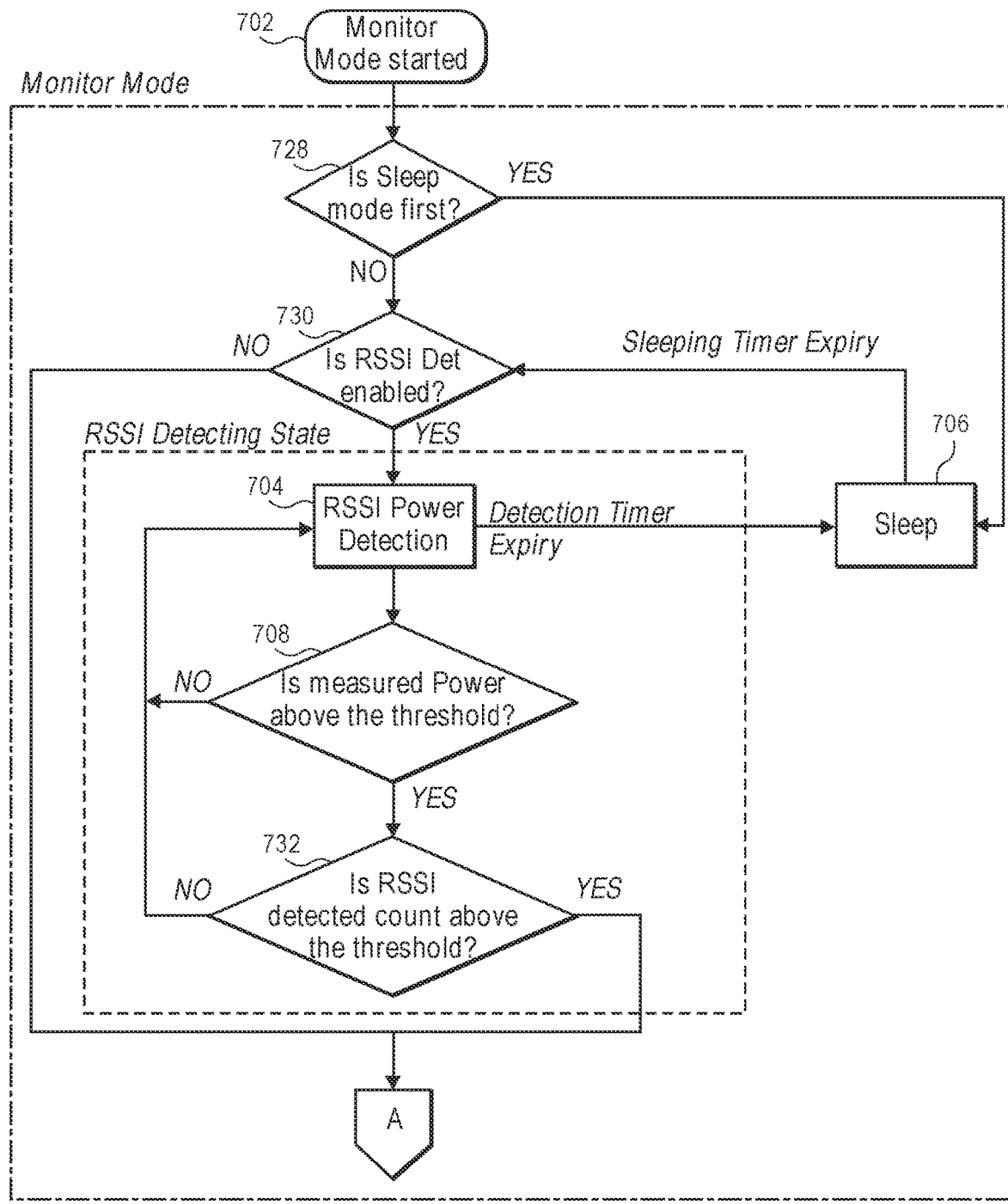
FIG. 7 illustrates a first portion of an example flow chart for a MS, in accordance with some embodiments.
Figure 8:
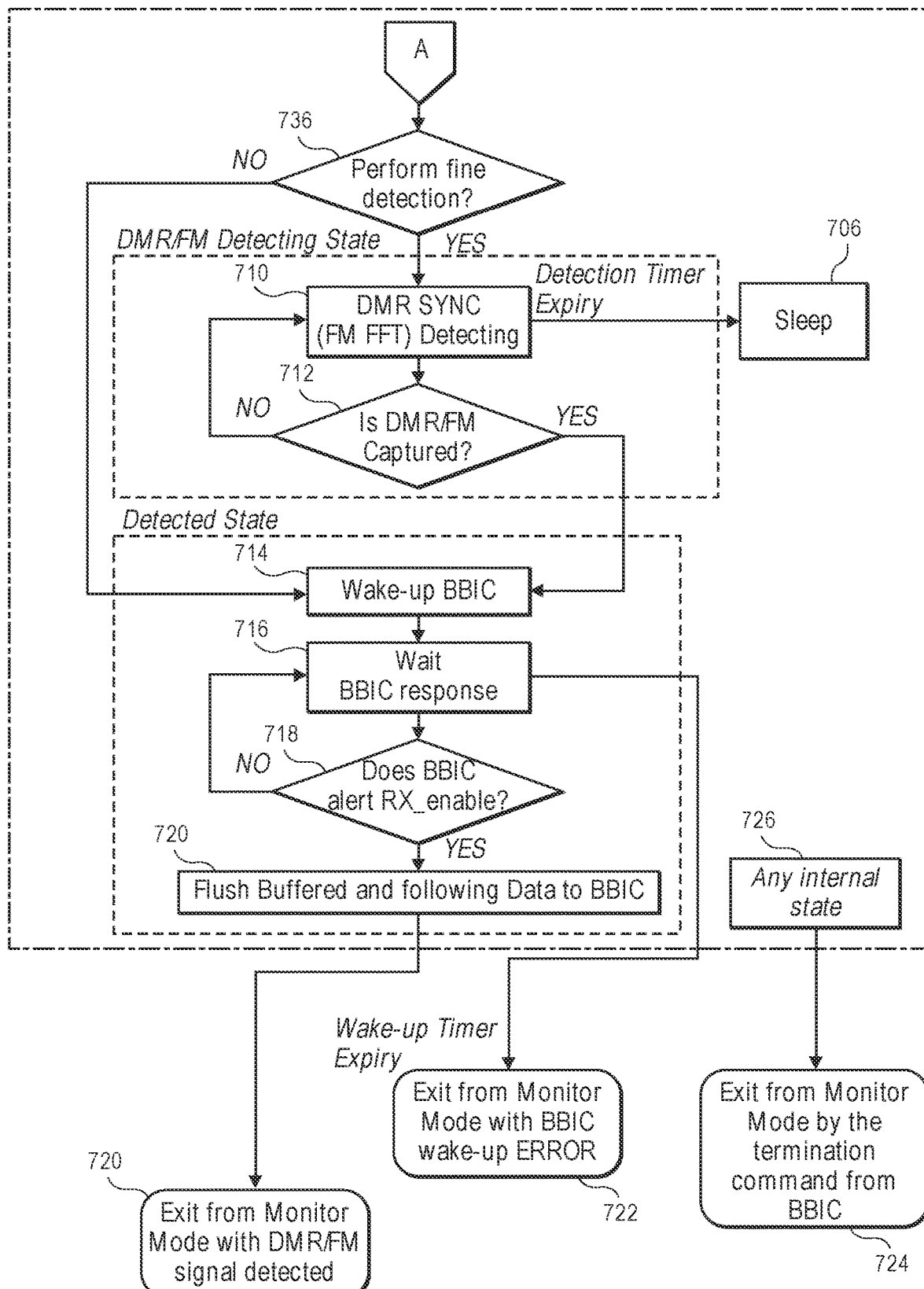
FIG. 8 illustrates a second portion of the example flow chart for a MS, in accordance with some embodiments.

When TRx is in the idle state with Rx and Tx enable low, the BBIC may alert a monitor enable. Before that, the BBIC may provide all of the configuration inputs required by the TRx. FIG. 7 and FIG. 8 illustrate portions of an example flow chart 700 for an MS, in accordance with some embodiments. In particular, the flow chart 700 indicates an operation flow that may be employed by the MS 200 (FIG. 2), which can include the portions of the communication processing module as illustrated in FIGS. 3-5, for DMR signal detection.

The operation flow may initiate at stage 702, where an idle state of the TRx MCU (such as the MCU 214 (FIG. 2)) is initiated. The idle state may be exited at any time by the BBIC dis-alerting the monitor enable, which may occur in response to a change in internal state of the MCU in stage 726. For example, the BBIC may dis-alert the monitor enable when a push-to-talk button of the MS is pressed, and may proceed to stage 724 where the idle state is exited.

Upon initiation of the idle state, the operation flow may proceed to stage 728. In stage 728, following the configuration given by the BBIC, the TRx MCU may determine whether the communication processing module is to initially enter a sleep state or initially enter a wake period of the idle state. Whether the communication processing module is to initially enter the sleep state or the wake period may be preconfigured or programmed. In response to the TRx MCU determining that the communication processing module is to enter the sleep state, the flow may proceed to stage 706 where the communication processing module is placed in a sleep state. In response to the TRx MCU determining that the communication processing module is to enter the wake period, the flow may proceed to stage 730.

In stage 730, following the configuration given by the BBIC, the TRx MCU may determine whether RSSI power detection is enabled. If the TRx MCU determines that the RSSI power detection is enabled, the flow may proceed to stage 704. If the TRx MCU determines that the RSSI power detection is disabled, the flow may proceed to stage 736 (shown in FIG. 8).

In response to determining that RSSI power detection is enabled, the MS may enter the power detecting mode 604 (FIG. 6). In particular, the operation flow may proceed to stage 704, where the TRx may perform the RSSI power detection operation on data received by the TRx. The BBIC may be in sleep mode upon initiation of the idle state. Upon completion of the RSSI power detection, the flow may continue to stage 708.

In stage 708, following the configuration given by the BBIC, the TRx may determine whether the received signal strength, as indicated by the RSSI produced by the RSSI power detection operation, of the data exceeds a threshold value. If the received signal strength exceeds the threshold value, the flow proceeds to stage 732. If the received signal strength is below the threshold value, the flow returns to stage 704.

If the TRx does not detect a received signal strength that exceeds the threshold value (as indicated by the flow continuously cycling between stage 704 and 708) for a detection time, the flow may proceed to stage 706. In particular, if a detection time expires prior to the detection of a received signal strength that exceeds the threshold value, the flow proceeds to stage 706.

In stage 706, the TRx (including the communication processing module) places itself into a sleep mode. The TRx may remain in the sleep mode until a sleep timer expires. In response to the sleep timer expiring while the flow is in stage 706, the flow may return to stage 704.

In stage 732, the TRx may determine whether a detected count of the RSSI is above a threshold value. For example, the TRx may determine whether a number of times the RSSI exceeds a threshold value is greater than a threshold number of times for the received signal strength to exceed the threshold value. If the detected count of the RSSI is below the threshold value, the flow may return to stage 704. If the detected count of the RSSI exceeds the threshold value, the flow may proceed to stage 736.

If the TRx determines that the detected count does not exceed the threshold value (as indicated by the flow continuously cycling among stages 704, 708, and 732) for a detection time, the flow may proceed to stage 706. In particular, if a detection time expires prior to the detection of a received signal strength that exceeds the threshold value, the flow proceeds to stage 706.

In stage 736, following the configuration given by the BBIC, the TRx MCU may determine whether fine detection of the signal is to be performed. For example, the TRx MCU may determine whether the waveform (such DMR or FM) of the signal is to be performed by the communication processing module. If the fine detection of the signal is to be performed, the flow may proceed to stage 710. If the fine detection of the signal is not to be performed, the flow may proceed to stage 714.

The TRx MCU may transition to the DMR detecting mode 606 (FIG. 6) and/or the FM detecting mode 612 (FIG. 6) when the flow proceeds to stage 710. For example, following the configuration given by the BBIC, the TRx MCU may alternate between the DMR detecting mode 606 and the FM detecting mode 612, or concurrently operate in the DMR detecting mode 606 and the FM detecting mode 612.

When in the DMR detecting mode 606 in stage 710, the TRx MCU may perform a DMR SYNC detection operation. The flow may proceed to stage 712 where the TRx MCU determines whether a DMR SYNC has been captured by the DMR SYNC detection operation. If the TRx MCU determines that a DMR SYNC has been captured, the flow proceeds to stage 714. If the TRx MCU determines that a DMR SYNC has not been captured, the flow returns to stage 710.

When in the FM detecting mode 612 in stage 710, the TRx MCU may perform an FM detection operation. The flow may proceed to stage 712 where the TRx MCU determines whether an FM signal has been detected by the FM detection operation. If the TRx MCU determines that an FM signal has been detected, the flow proceeds to stage 714. If the TRx MCU determines that an FM signal has not been detected, the flow returns to stage 710.

If the TRx MCU does not capture a DMR SYNC or an FM signal (as indicated by the flow continuously cycling between stage 710 and 712) for a detection time, the flow may proceed to stage 706 (where stage 706 refers to the same stage in both FIG. 7 and FIG. 8). In particular, if a detection time expires prior to the DMR SYNC or the FM signal being captured, the flow proceeds to stage 706, where the TRx (including the communication processing module) is placed into a sleep mode.

The TRx may transition to the DMR detected mode 610 (FIG. 6) and/or the FM detected mode when the flow proceeds to stage 714. In stage 714, the wake-up procedure of the BBIC of the MS may be initiated. The flow may proceed to stage 716.

In stage 716, the TRx may wait for the BBIC to complete the wake-up procedure. The flow may proceed to stage 718, where the TRx determines whether the BBIC has completed the wake-up procedure based on whether the reception enable of the BBIC has been alerted. If the reception enable has not been alerted, the flow returns to stage 716. If the reception enable has been alerted, the flow proceeds to stage 720.

If the TRx determines that the BBIC has not completed the wake-up procedure (as indicated by the flow continuously cycling between stage 716 and 718) within a wake-up time period, the flow may proceed to stage 738. In stage 738, the TRx may exit the monitor mode and provide an indication that the BBIC did not complete the wake-up procedure within the wake-up time period. For example, the TRx may provide an indication that a digital baseband processor (DBB) of the BBIC is non-operational.

In stage 720, the TRx may flush the data stored by the storage device 308 and the data received by the communication processing module to the BBIC. When the TRx completes flushing of the data, the flow may proceed to stage 722 where the DMR detected mode 610 is exited and the reception enable of the BBIC is dis-alerted. Further, in stage 722 the idle state is exited with the DMR signal detected.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method to detect signals by a transceiver coupled to a digital baseband processor, comprising:
   while digital baseband processor is in a sleep state, receiving and sampling signals by the transceiver;
   determining a received signal strength indicator based on the received signals;
   performing correlation operations of samples of the received signals with different frame synchronization codes;
   buffering outputs of the correlation operations and the samples of the received signals in a storage; and
   triggering a wake-up of the digital baseband processor, and providing the samples of the received signals buffered in the storage to the digital baseband processor based on the received signal strength indicator exceeding a threshold.

2. The method of claim 1, further comprising:
   disabling some correlation processors and leaving a correlation processor that detected a frame synchronization code enabled.

3. The method of claim 1, wherein determining the received signal strength indicator comprises:
   accumulating, on a sample by sample basis, filtered channel power of the received signals.

4. The method of claim 3, wherein the accumulating is performed over a programmable duration.

5. The method of claim 3, wherein the accumulating is restarted if the received signal strength indicator does not reach a detection threshold.

6. The method of claim 1, wherein determining the received signal strength indicator comprises:
   providing an output in a unit of decibels relative to full scale for a given channel.

7. The method of claim 1, wherein determining the received signal strength indicator comprises:
   subtracting an accumulated filtered channel power by a gain from an automatic gain control block of the transceiver to obtain the received signal strength indicator.

8. The method of claim 1, wherein the providing is performed while the digital baseband processor is in an active state.

9. A method to detect signals by a transceiver coupled to a digital baseband processor, comprising:
   while digital baseband processor is in a sleep state and during a wake period of the transceiver, receive signals by the transceiver;
   producing, by the transceiver, processed data from the received signals;
   identifying a land mobile radio signal from the processed data; and
   in response to identifying the land mobile radio signal, triggering a wake-up of the digital baseband processor, and disabling one or more correlation processors not operating with land mobile radio signal frame synchronization codes.

10. The method of claim 9, wherein the identifying is performed in response to a received signal strength of the received signals exceeding a threshold.

11. The method of claim 9, wherein identifying comprises:
    correlating the processed data and a loaded frame synchronization code by parallel correlation processors operating with different frame synchronization codes.

12. The method of claim 9, further comprising:
    in response to identifying the land mobile radio signal, leaving a correlation processor having a detected land mobile radio signal frame synchronization code loaded enabled.

13. The method of claim 9, further comprising:
    in response to identifying the land mobile radio signal, determining a location of a read pointer of a storage device storing processed data based on an index of a detected frame synchronization code, and propagation and detection delay.

14. The method of claim 9, wherein identifying comprises:
    performing fast Fourier transform based spectrum estimation to identify frequency modulation signal.

15. The method of claim 9, further comprising:
identifying a frequency modulation signal from the processed data; and
in response to identifying the frequency modulation signal, triggering a wake-up of the digital baseband processor, and disabling one or more correlation processors.

16. A transceiver in electrical communication with a digital baseband processor, comprising:
- a receiver channel to receive signals from an antenna while the digital baseband processor is in a sleep state;
- a communication processing circuitry to process signals received by the receiver channel, including detecting one or more of: land mobile radio signal, and frequency modulation signal;
- a storage device to store data associated with the received signals and provide the data to the digital baseband processor while the digital baseband processor is in an active state; and
- a correlator component having independent correlation processors operating in parallel, wherein a given correlation processor correlates a sample of the received signals against a frame synchronization code corresponding to the given correlation processor.

17. The transceiver of claim 16, wherein each correlation processor are independently loaded with a corresponding frame synchronization code comprising 24 two-state symbols in length.

18. The transceiver of claim 16, wherein the independent correlation processors are individually enabled or disabled according to an enable bit pattern.

19. The transceiver of claim 16, wherein the communication processing circuitry comprises:
- a frequency discriminator component to facilitate demodulation of frequency modulated data in the received signals.

20. The transceiver of claim 16, wherein the communication processing circuitry comprises:
- a frequency discriminator component comprising different demodulators, wherein the frequency discriminator component is to receive an indication of which demodulator is to be utilized.

* * * * *